(12) United States Patent
Cadouri

(10) Patent No.: US 7,039,543 B1
(45) Date of Patent: May 2, 2006

(54) TRANSFORMING YIELD INFORMATION OF A SEMICONDUCTOR FABRICATION PROCESS

(75) Inventor: Eitan Cadouri, Cupertino, CA (US)

(73) Assignee: PDF Solutions, Inc., San Jose, CA (US)

( * ) Notice: Subject to any disclaimer, the term of this patent is extended or adjusted under 35 U.S.C. 154(b) by 26 days.

(21) Appl. No.: 10/803,787

(22) Filed: Mar. 17, 2004

Related U.S. Application Data

(60) Provisional application No. 60/454,702, filed on Mar. 17, 2003.

(51) Int. Cl.
 *G06F 19/00* (2006.01)
(52) U.S. Cl. .................... 702/117; 702/81; 702/118; 702/179; 700/121
(58) Field of Classification Search ........... 702/117, 702/57–59, 35, 36, 81–84, 118, 179, 180, 702/183, 185, 187, 108; 700/108–110, 117, 700/121, 95; 438/10, 11, 14, 7, 16–18, 5; 324/500, 512, 537, 765, 73.1
See application file for complete search history.

(56) References Cited

U.S. PATENT DOCUMENTS

| | | | |
|---|---|---|---|
| 6,265,232 B1 * | 7/2001 | Simmons | 438/14 |
| 6,289,257 B1 * | 9/2001 | Sekine | 700/121 |
| 6,393,602 B1 * | 5/2002 | Atchison et al. | 716/4 |
| 6,537,834 B1 * | 3/2003 | Weng et al. | 438/14 |
| 6,717,431 B1 * | 4/2004 | Rathei et al. | 324/765 |
| 6,751,519 B1 * | 6/2004 | Satya et al. | 700/121 |
| 6,842,663 B1 * | 1/2005 | Yamada et al. | 700/121 |

\* cited by examiner

*Primary Examiner*—Hal Wachsman
(74) *Attorney, Agent, or Firm*—Morrison&Foerster LL

(57) ABSTRACT

Publishable yield information can be produced by obtaining an actual yield value associated with an integrated circuit (IC) or portion of an IC formed on each one of a plurality of wafers using a semiconductor wafer fabrication process. An average yield value associated with a plurality of ICs or portions of an IC formed on each one of the plurality of wafers using the semiconductor fabrication process is determined. A transformed yield value associated with the IC or portion of an IC is generated using the actual yield value and the average yield value.

20 Claims, 3 Drawing Sheets

Fig. 5

| y\x | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 11 | | | | | 38 | 97 | 96 | 108 | 95 | 82 | 105 | 104 | | | | |
| 10 | | | 44 | 86 | 107 | 97 | 108 | 108 | 109 | 102 | 109 | 105 | 99 | 86 | | |
| 9 | | 42 | 103 | 96 | 103 | 107 | 98 | 108 | 108 | 101 | 108 | 109 | 82 | 109 | 102 | |
| 8 | 26 | 102 | 103 | 108 | 105 | 108 | 108 | 103 | 105 | 107 | 100 | 108 | 97 | 108 | 98 | 31 |
| 7 | 90 | 102 | 108 | 107 | 105 | 104 | 107 | 108 | 107 | 108 | 104 | 109 | 104 | 92 | 102 | 98 |
| 6 | 103 | 108 | 104 | 109 | 109 | 109 | 109 | 90 | 80 | 109 | 104 | 109 | 98 | 104 | 108 | 103 |
| 5 | 88 | 109 | 109 | 107 | 108 | 107 | 110 | 107 | 88 | 103 | 108 | 103 | 93 | 96 | 108 | 87 |
| 4 | 104 | 109 | 109 | 108 | 103 | 108 | 108 | 104 | 103 | 109 | 108 | 101 | 105 | 104 | 105 | 98 |
| 3 | 38 | 104 | 107 | 103 | 107 | 108 | 109 | 109 | 108 | 107 | 108 | 107 | 105 | 104 | 108 | 79 |
| 2 | | 89 | 108 | 108 | 96 | 108 | 103 | 108 | 101 | 108 | 104 | 86 | 107 | 89 | 86 | |
| 1 | | | 109 | 101 | 86 | 85 | 82 | 108 | 97 | 108 | 79 | 108 | 102 | 105 | | |

| y\x | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 11 | | | | | 38 | 97 | 96 | 100 | 95 | 82 | 100 | 100 | | | | |
| 10 | | | 44 | 86 | 100 | 97 | 100 | 100 | 100 | 100 | 100 | 100 | 99 | 86 | | |
| 9 | | 42 | 100 | 96 | 100 | 100 | 98 | 100 | 100 | 100 | 100 | 100 | 82 | 100 | 100 | |
| 8 | 26 | 100 | 100 | 100 | 100 | 100 | 100 | 100 | 100 | 100 | 100 | 100 | 97 | 100 | 98 | 31 |
| 7 | 90 | 100 | 100 | 100 | 100 | 100 | 100 | 100 | 100 | 100 | 100 | 100 | 92 | 100 | 100 | 98 |
| 6 | 100 | 100 | 100 | 100 | 100 | 100 | 100 | 90 | 80 | 100 | 100 | 100 | 98 | 100 | 100 | 100 |
| 5 | 88 | 100 | 100 | 100 | 100 | 100 | 100 | 100 | 88 | 100 | 100 | 100 | 93 | 96 | 100 | 87 |
| 4 | 100 | 100 | 100 | 100 | 100 | 100 | 100 | 100 | 100 | 100 | 100 | 100 | 100 | 100 | 100 | 98 |
| 3 | 38 | 100 | 100 | 100 | 100 | 100 | 100 | 100 | 100 | 100 | 100 | 100 | 100 | 100 | 100 | 79 |
| 2 | | 89 | 100 | 100 | 96 | 100 | 100 | 100 | 100 | 100 | 100 | 86 | 100 | 89 | 86 | |
| 1 | | | 100 | 100 | 86 | 85 | 82 | 100 | 97 | 100 | 79 | 100 | 100 | 100 | | |

302

TRANSFORMING YIELD INFORMATION OF A SEMICONDUCTOR FABRICATION PROCESS

CROSS-REFERENCE TO RELATED APPLICATIONS

This application claims the benefit of U.S. Provisional Application No. 60/454,702, titled A PROCESS FOR PUBLISHING PRODUCTS YIELD INFORMATION, filed Mar. 17, 2003, the entire content of which is incorporated herein by reference.

BACKGROUND

1. Field of the Invention

The present application relates generally to fabricating integrated circuits (ICs) on semiconductor wafers using a semiconductor fabrication process, and more particularly to transforming yield information of the semiconductor fabrication process.

2. Related Art

Integrated circuits (ICs) are formed on a semiconductor wafer using a semiconductor fabrication process. Typically a set of wafers, called a lot, are stacked and processed together during mass fabrication of ICs. A lot of wafers may be placed in a cassette and processed together using the same fabrication process. Once a lot of wafers are completely processed, they are cut into individual chips also called dice.

During mass manufacture of ICs, defects may exist in some of the ICs produced. For example, variations can be introduced during the fabrication process that adversely affects specific locations on a wafer. If these variations are too far from specified tolerances, an IC may not function properly when tested. Some ICs may be repairable while others may not be. If after testing and repair these ICs are unusable, the ICs may be labeled defective and discarded.

Typically, semiconductor manufacturers obtain and analyze yield information. However, manufacturers may not always have the expertise or may not have the time to analyze yield information for improving the fabrication process. An outside party/company may have the ability to analyze the yield information; however, manufacturers are reluctant to release their yield information to outside parties/companies. As a result, semiconductor companies do not typically publish their yield information (i.e., make their yield information available to outside parties/companies).

SUMMARY

In an exemplary embodiment, publishable yield information is produced by obtaining an actual yield value associated with an integrated circuit (IC) or portion of an IC formed on each one of a plurality of wafers using a semiconductor wafer fabrication process. An average yield value associated with a plurality of ICs or portions of an IC formed on each one of the plurality of wafers using the semiconductor fabrication process is determined. A transformed yield value associated with the IC or portion of an IC is generated using the actual yield value and the average yield value.

DESCRIPTION OF DRAWING FIGURES

The present application can be best understood by reference to the following description taken in conjunction with the accompanying drawing figures, in which like parts may be referred to by like numerals:

FIG. 5 depicts an exemplary set of transformed yield values; and

FIG. 6 depicts another exemplary set of transformed yield values.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
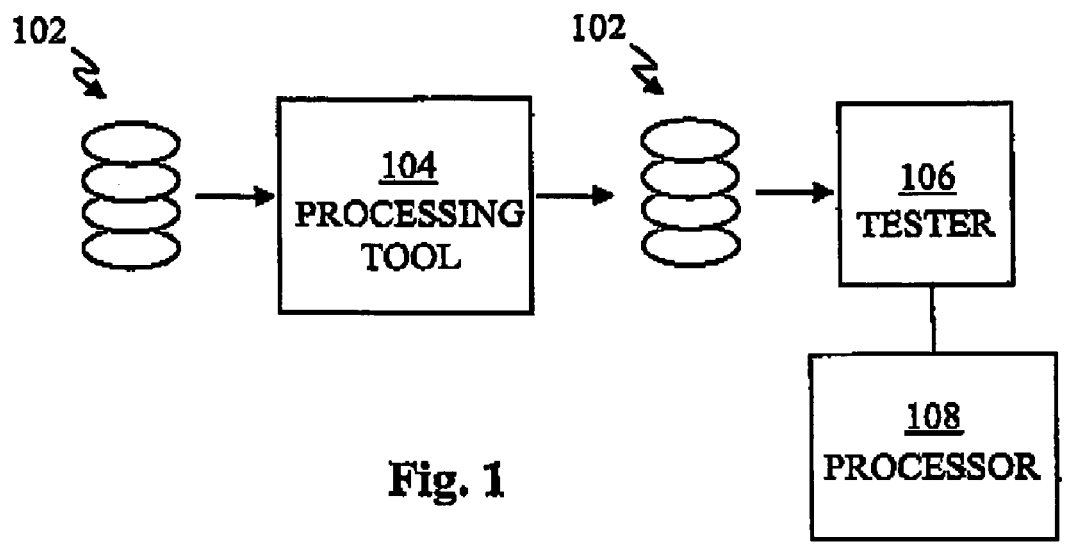
FIG. 1 depicts an exemplary process of fabricating and testing ICs on semiconductor wafers.

With reference to FIG. 1, a plurality of semiconductor wafers 102 can be processed using a processing tool 104 to form integrated circuits (ICs) on wafers 102. After the ICs are formed on wafers 102, a tester 106 performs one or more tests on the ICs formed on wafers 102. In general, ICs that fail the one or more tests are marked and discarded. It should be recognized that wafers 102 can be processed using any number of processing tools, and tested using any number of testers.

Yield information, such as the number of ICs that pass or fail the one or more tests, can be used to monitor, adjust, and optimize processing tool 104. As noted above, yield information is highly confidential, and semiconductor manufacturers are reluctant to publish their yield information (i.e., provide their yield information to any outside party/company).

Figure 2:
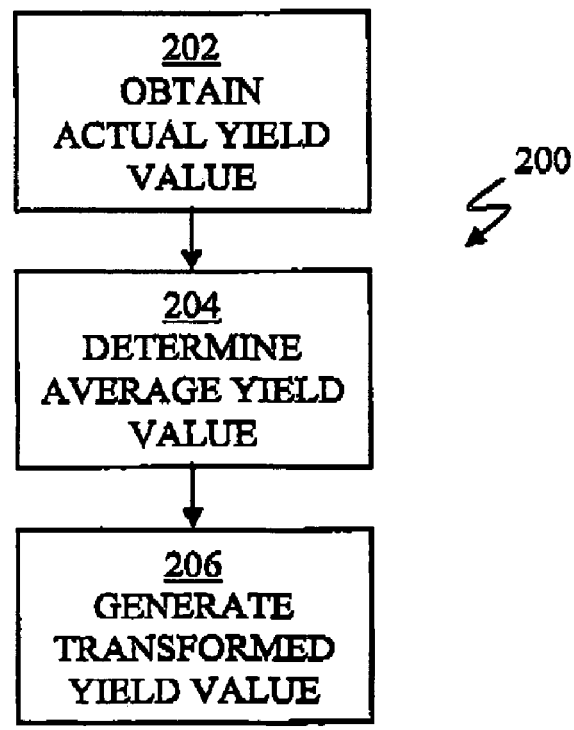
FIG. 2 depicts an exemplary process of producing publishable yield information.

With reference to FIG. 2, an exemplary process 200 is depicted for producing publishable yield information. It should be recognized that process 200 can be performed using software, hardware, or combination of software and hardware.

In step 202, an actual yield value associated with an IC or portion of an IC formed on each one of a plurality of wafers using a semiconductor wafer fabrication process is obtained. With reference to FIG. 1, the fabrication process can be performed using processing tool 104.

In one exemplary embodiment, tester 106 performs one or more tests on a particular IC or portion of an IC formed on each one of the wafers 102. In the present exemplary embodiment, processor 108 obtains the actual yield value associated with the particular IC or portion of an IC. In particular, processor 108 can determine the number of particular ICs or portions of an IC that passed the one or more tests. Processor 108 can then calculate the actual yield value as a ratio of the number of particular ICs or portions of an IC that passed the one or more tests and a total number of particular ICs or portions of an IC tested.

With reference to FIG. 2, in step 204, an average yield value associated with a plurality of ICs or portions of an IC formed on each one of the plurality of wafers using the semiconductor fabrication process is determined. It should be recognized that the IC or portion of an IC referred to in step 202 can be one of the plurality of ICs or portions of an IC referred to in step 204. Alternatively, the plurality of ICs or portions of an IC referred to in step 204 can be ICs or portions of an IC formed on each one of the plurality of wafers other than the IC or portion of an IC referred to in step 202. It should also be recognized that the plurality of ICs or portions of an IC referred to in step 204 can include all of the ICs or portions of an IC formed on each one of the plurality of wafers. Alternatively, the plurality of ICs or portions of an IC referred to in step 204 can include a subset of all of the ICs or portions of an IC formed on each one of the plurality of wafers.

For example, assume that a total of 100 ICs are formed on each one of a plurality of wafers. In step 202, an actual yield associated with one of the 100 ICs can be obtained. In step 204, an average yield value associated with all 100 ICs can be determined. Alternatively, an average yield value associated with 99 of the 100 ICs, which excludes the one IC referred to in step 202, can be determined. Also, an average yield value associated with a subset of the 100 ICs, which can include or exclude the one IC referred to in step 202, can be determined.

With reference to FIG. 1, in one exemplary embodiment, tester 106 performs one or more tests on a plurality of ICs or portions of ICs formed on each one of the wafers 102. In the present exemplary embodiment, processor 108 determines the average yield value associated with the plurality of ICs or portions of an IC. In particular, processor 108 can determine the number of the plurality of ICs or portions of an IC that passed the one or more tests. Processor 108 can then calculate the average yield value as a ratio of the number of the plurality of ICs or portions of an IC that passed the one or more tests and a total number of the plurality of ICs or portions of an IC tested.

With reference to FIG. 2, in step 206, a transformed yield value associated with the IC or portion of an IC is generated using the actual yield value and the average yield value. One characteristic of the transformed yield value is that the actual yield value cannot be derived or cannot be easily derived from the transformed yield value without knowing the average yield value. Another characteristic of the transformed yield value is that the transformed yield value provides a yield characteristic of the IC or portion of an IC. Thus, a manufacturer can provide the transformed yield value to an outside party/company without having to disclose the actual yield value. If the manufacturer does not disclose the average yield value that was used to generate the transformed yield value, the outside party/company cannot derive or cannot easily derive the actual yield value from the transformed yield value. However, because the transformed yield value provides a yield characteristic of the IC or portion of an IC, the outside party/company can still perform yield related analysis using the transformed yield value.

In one exemplary embodiment, the transformed yield value is a normalized value. In particular, the transformed yield value is generated by dividing the actual yield value by the average yield value. If the transformed yield value is greater than 100%, it can be scaled down to 100%.

In another exemplary embodiment, the transformed yield value is generated by scaling the actual yield value by a factor and dividing the scaled actual yield by the average yield value. For example, a factor of one or more sigma values can be used. In the present exemplary embodiment, the actual yield value is multiplied by one or more sigma values.

In still another exemplary embodiment, the transformed yield value is generated by quantizing the actual yield value. To quantize the actual yield value, a range of actual yield value is defined. The range of actual yield values is divided into a plurality of groups. Each group is associated with a number. The actual yield value is then sorted into a group from the plurality of groups. The actual yield value is replaced by the number associated with the group. This number is then divided by the average yield value to generate the transformed yield value.

For example, assume a range of actual yield value is defined between 0 to 100%. This range is divided into a group 1 for actual yield values from 0 to less than 25%, group 2 for actual yield values from 25 to less than 50%, group 3 for actual yield values from 50 to less than 75%, and group 4 defined for actual yield values from 75 to 100%. Actual yield values that fall into group 1 may be assigned a value of zero. Actual yield values that fall into group 2 may be assigned a value of one. Actual yield values that fall into group 3 may be assigned a value of two. Actual yield values that fall into group 4 may be assigned a value of three.

Figure 3:
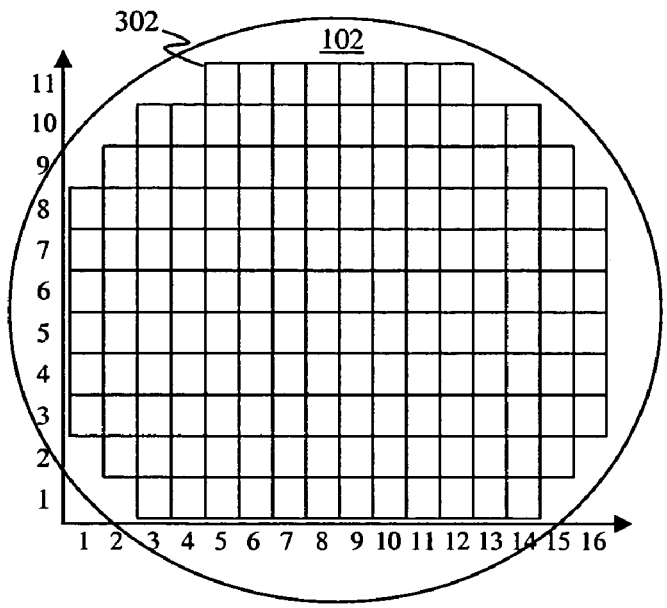
FIG. 3 depicts an exemplary wafer with a plurality of dice.

With reference to FIG. 2, it should be recognized that process 200 can be used to produce publishable yield information for dice formed on a plurality of wafers in addition to ICs and portions of ICs. With reference to FIG. 3, dice 302 are depicted as being formed in a pattern (i.e., a die placement) on wafer 102. Typically, an individual die 302 is identified by its location on wafer 102. As depicted in FIG. 3, a location on wafer 102 can be defined by a column and row position. Although, FIG. 3 depicts dice 302 formed on a single wafer, it should be recognized that dice 302 can be formed on any number of wafers.

In one exemplary embodiment, an IC is formed on a die 302. Thus, in performing step 202 (FIG. 2), an actual yield associated with a die 302 formed on each one of a plurality of wafers is obtained. For example, assume that an actual yield associated with die 302 located at row 11, column 5 is to be determined. Assume that a total of 100 wafers are produced having die 302 located at row 11, column 5. In the present exemplary embodiment, die 302 located at row 11, column 5 is tested on each of the 100 wafers. Assume that die 302 located at row 11, column 5 passed on 35 of the 100 wafers, and failed on 65 of the 100 wafers. Thus, in this example and exemplary embodiment, the actual yield associated with die 302 located at row 11, column 5 is 35%.

In the present exemplary embodiment, in performing step 204 (FIG. 2), an average yield value associated with dice 302 is obtained. Returning to the example above, assume that after dice 302 are formed on the 100 wafers, each die 302 on each of the 100 wafers is tested. In the present example, as depicted in FIG. 3, there are a total of 156 dice 302. Thus, in the present example, a total of 15,600 dice 302 are tested. Assume that 14,180 dice of the 15,600 tested dice passed, and 1420 dice of the 15,600 tested dice failed. Thus, in this example and exemplary embodiment, the average yield value associated with all dice 302 formed on the 100 wafers is about 91%.

In the present exemplary embodiment, in performing step 206 (FIG. 2), a transformed yield value, which in the present exemplary embodiment is a normalized yield value, associated with dice 302 located at row 11, column 5 is generated by dividing the determined actual yield of 35% by the determined average yield value of 91%. Thus, in this example and exemplary embodiment, the normalized yield value associated with dice 302 located at row 11, column 5 is about 38%.

Figure 4:
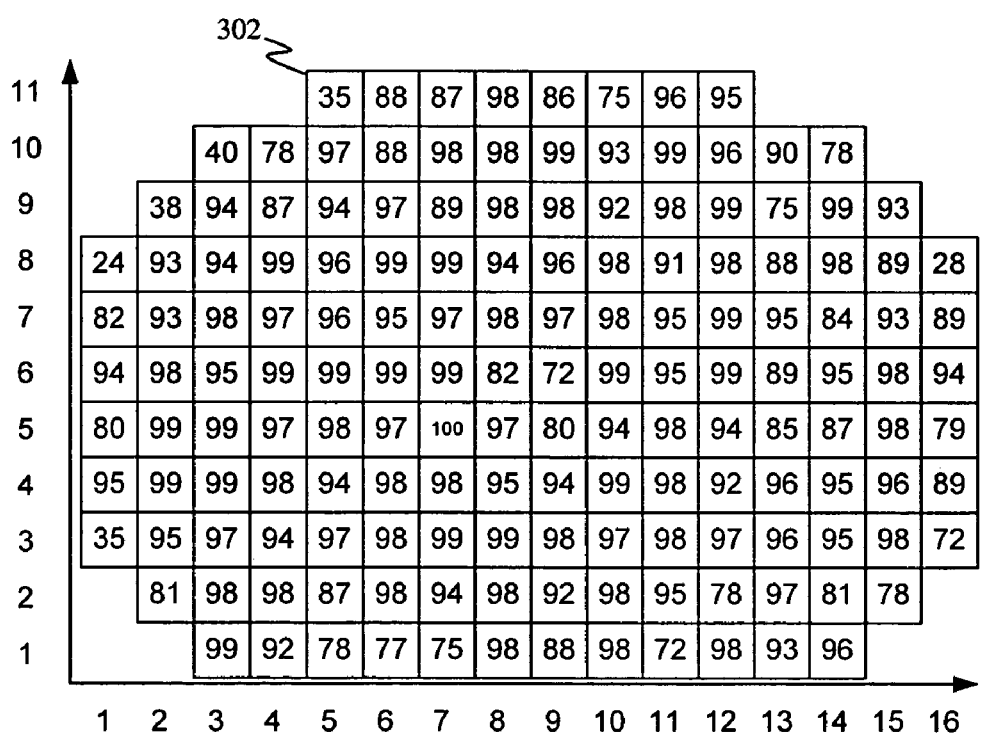
FIG. 4 depicts an exemplary set of actual yield values.

With reference to FIG. 4, an exemplary set of actual yield values associated with dice 302 is depicted. With reference to FIG. 5, an exemplary set of normalized yield value associated with dice 302 is depicted. With reference to FIG. 6, the normalized yield values greater than 100% can be scaled to 100%. In one exemplary embodiment, the actual yield values can be scaled by a factor, such as by one or more sigma values. In another exemplary embodiment, actual yield values can be quantized into any number of groups.

Although exemplary embodiments have been described, various modifications can be made without departing from the spirit and/or scope of the present invention. Therefore, the present invention should not be construed as being limited to the specific forms shown in the drawings and described above.

The invention claimed is:

1. A method for producing yield information, the method comprising:
obtaining an actual yield value associated with a particular integrated circuit (IC) or portion of an IC, wherein the particular IC or portion of an IC is formed on each one of a plurality of wafers using a semiconductor wafer fabrication process;
determining an average yield value associated with a plurality of ICs or portions of an IC formed on each one of the plurality of wafers using the semiconductor fabrication process; and
generating a transformed yield value associated with the particular IC or portion of an IC using the actual yield value and the average yield value.

2. The method of claim 1, wherein obtaining an actual yield value comprises:
testing the particular IC or portion of an IC formed on each one of the plurality of wafers; and
determining a number of the particular ICs or portions of an IC that pass the testing,
wherein the actual yield value is a ratio of the number of the particular ICs or portions of an IC that pass the testing and a total number of the particular ICs or portions of an IC tested.

3. The method of claim 1, wherein determining an average yield value comprises:
testing the plurality of ICs or portions of an IC formed on each one of the plurality of wafers; and
determining a number of the plurality of ICs or portions of an IC that pass the testing,
wherein the average yield value is a ratio of the number of the plurality of ICs or portions of an IC that pass the testing and a total number of the plurality of ICs or portions of an IC tested.

4. The method of claim 1, wherein generating a transformed yield value comprises:
dividing the actual yield value by the average yield value.

5. The method of claim 4, wherein generating a transformed yield value further comprises:
scaling the actual yield value by a factor.

6. The method of claim 5, the factor includes one or more sigma values, and wherein scaling the actual yield value comprises:
multiplying the actual yield value by the one or more sigma values.

7. The method of claim 4, wherein generating a transformed yield value further comprises:
quantizing the actual yield value.

8. The method of claim 7, wherein quantizing the actual yield value comprises:
defining a range of actual yield values;
dividing the range of actual yield values into a plurality of groups, wherein each group is associated with a number;
sorting the actual yield value into a group from the plurality of groups; and
replacing the actual yield value with the number associated with the group.

9. The method of claim 1, wherein the actual yield value cannot be derived from the transformed yield value without knowing the average yield value.

10. The method of claim 9, wherein the transformed yield value provides a yield characteristic of the particular IC or portion of the IC.

11. A method for producing yield information, the method comprising:
obtaining an actual yield value associated with a die formed on each one of a plurality of wafers using a semiconductor wafer fabrication process;
determining an average yield value associated with all dice formed on each one of the plurality of wafers using the semiconductor fabrication process; and
generating a normalized yield value associated with the die by dividing the actual yield value by the average yield value.

12. The method of claim 11, wherein obtaining an actual yield value comprises:
testing the die formed on each one of the plurality of wafers; and
determining a number of dice that pass the testing,
wherein the actual yield value is a ratio of the number of dice that pass the testing and a total number of dice tested.

13. The method of claim 11, wherein determining an average yield value comprises:
testing all of the dice formed on each one of the plurality of wafers; and
determining a number of all of the dice that pass the testing,
wherein the average yield value is a ratio of number of all of the dice that pass the testing and a total number of all of the dice tested.

14. The method of claim 11, wherein generating a normalized yield value further comprises:
scaling the actual yield value by a factor.

15. The method of claim 14, wherein the factor includes one or more sigma values, and wherein scaling the actual yield value comprises:
multiplying the actual yield value by the one or more sigma values.

16. The method of claim 11, wherein generating a normalized yield value further comprises:
quantizing the actual yield value.

17. The method of claim 16, wherein quantizing the actual yield value comprises:
defining a range of actual yield values;
dividing the range of actual yield values into a plurality of groups, wherein each group is associated with a number;
sorting the actual yield value into a group from the plurality of groups; and
replacing the actual yield value with the number associated with the group.

18. The method of claim 11, wherein the actual yield value cannot be derived from the normalized yield value without knowing the average yield value, and wherein the normalized yield value provides a yield characteristic of the die.

19. A system for producing yield information, the system comprising:
- a plurality of wafers having a particular integrated circuit (IC) or portion of an IC and a plurality of ICs or portions of an IC formed on each one of the plurality of wafers;
- a tester configured to test the particular IC or portion of the IC and the plurality ICs or portions of an IC on each one of the plurality of wafers; and
- a processor configured to obtain an actual yield value associated with the particular IC or portion of an IC, determine an average yield value associated with the plurality of ICs or portions of an IC formed on each one of the plurality of wafers, and generate a transformed yield value associated with the particular IC or portion of an IC using the actual yield value and the average yield value.

20. The system of claim 19, wherein the actual yield value cannot be derived from the transformed yield value without knowing the average yield value, and wherein the transformed yield value provides a yield characteristic of the particular IC or portion of the IC.

* * * * *